US012582084B2

(12) United States Patent
Schoutens et al.

(10) Patent No.: US 12,582,084 B2
(45) Date of Patent: Mar. 24, 2026

(54) MILKING SYSTEM WITH SENSOR DEVICE

(71) Applicant: LELY PATENT N.V., Maassluis (NL)

(72) Inventors: Bas Schoutens, Delft (NL); Mattheus Jacob De Hullu, Delft (NL)

(73) Assignee: LELY PATENT N.V., Maassluis (NL)

( * ) Notice: Subject to any disclaimer, the term of this patent is extended or adjusted under 35 U.S.C. 154(b) by 180 days.

(21) Appl. No.: 18/710,685

(22) PCT Filed: Dec. 8, 2022

(86) PCT No.: PCT/IB2022/061927
§ 371 (c)(1),
(2) Date: May 16, 2024

(87) PCT Pub. No.: WO2023/111783
PCT Pub. Date: Jun. 22, 2023

(65) Prior Publication Data
US 2025/0031657 A1      Jan. 30, 2025

(30) Foreign Application Priority Data

Dec. 13, 2021    (NL) ...................................... 2030111

(51) Int. Cl.
*A01J 5/01*            (2006.01)
*A01J 5/06*            (2006.01)
(52) U.S. Cl.
CPC .. *A01J 5/01* (2013.01); *A01J 5/06* (2013.01)
(58) Field of Classification Search
CPC ............... A01J 5/01; A01J 5/0133; A01J 5/06
See application file for complete search history.

(56) References Cited

U.S. PATENT DOCUMENTS 6,604,053 B2 *   8/2003   Fematt ...................... A01J 5/01
                                                            702/50
6,722,208 B2 *   4/2004   Brown .................. A01J 5/0134
                                                            73/861.15
(Continued)

FOREIGN PATENT DOCUMENTS

NL            9400997          2/1996
WO      WO 2011/064770 A2      6/2011
(Continued)

OTHER PUBLICATIONS

International Search Report issued on Mar. 1, 2023 in PCT/IB2022/061927 filed on Dec. 8, 2022, 4 pages.

*Primary Examiner* — Walter L Lindsay, Jr.
*Assistant Examiner* — Milton Gonzalez
(74) *Attorney, Agent, or Firm* — Oblon, McClelland, Maier & Neustadt, L.L.P.

(57)                ABSTRACT

A milking system for milking a milking animal includes a teatcup for fitting on a teat of the milking animal, and a measuring chamber connected directly and rigidly thereto. The teatcup has a longitudinal direction, and a first milk outflow orifice for milk outflow parallel to the longitudinal direction. The measuring chamber has a peripheral wall, a milk inlet in fluid communication therewith, a second milk outflow orifice to a milk tube, a vacuum outlet, and a sensor device for determining a property of the milk in the measuring chamber. In a plane perpendicular to the longitudinal direction, the measuring chamber has a first inside diameter in a first direction, and a smaller second diameter in a perpendicular second direction.

17 Claims, 3 Drawing Sheets

(56)        References Cited

U.S. PATENT DOCUMENTS

Figure 1:
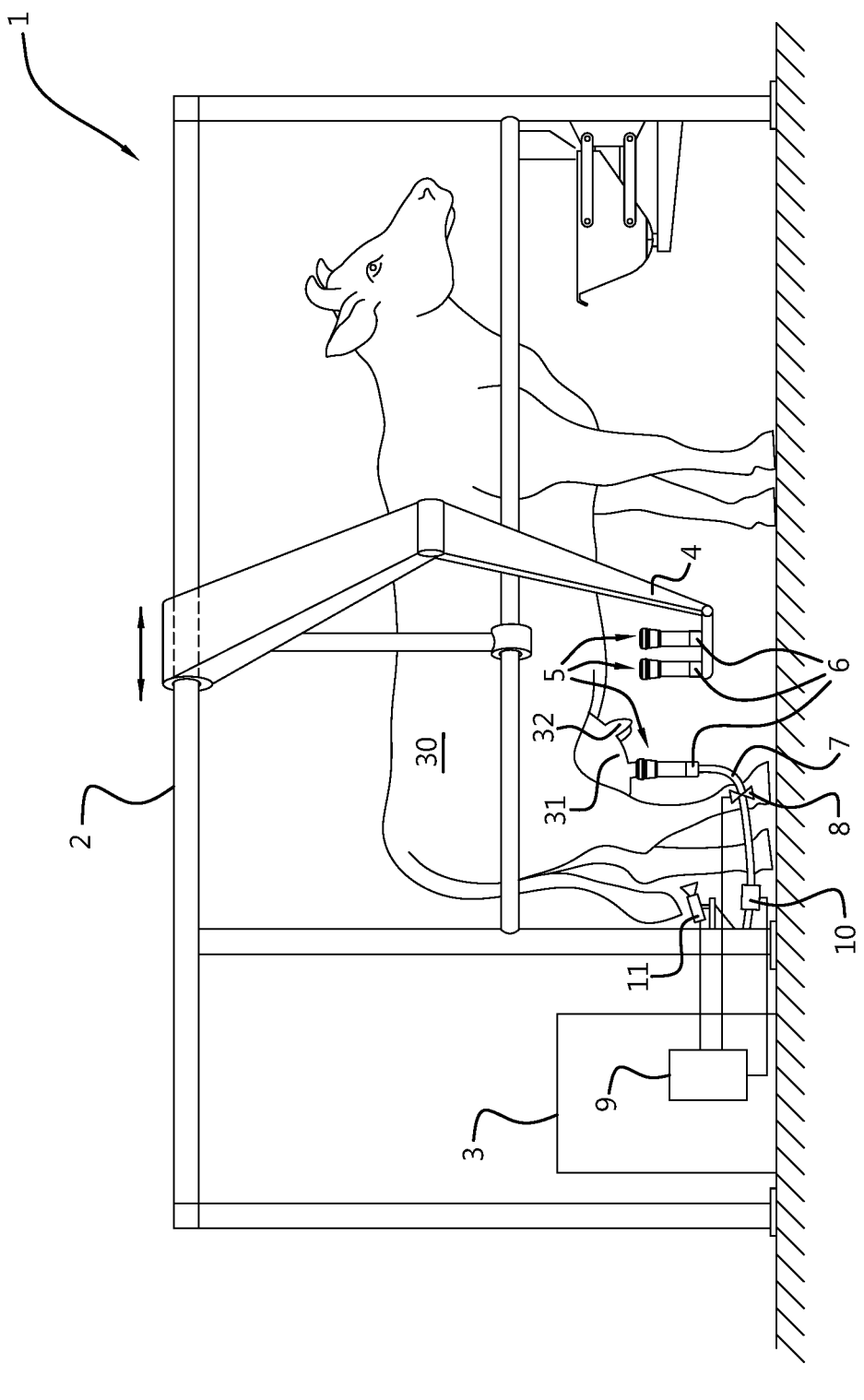

| 7,992,450 | B2 * | 8/2011 | Springer | .................. | G01F 1/56 |
| | | | | | 73/861.08 |
| 8,250,930 | B2 * | 8/2012 | Krone | ...................... | A01J 5/01 |
| | | | | | 73/861.04 |

FOREIGN PATENT DOCUMENTS

| WO | WO 2018/111092 A1 | 6/2018 |
| WO | WO 2018/111093 A1 | 6/2018 |
| WO | WO 2018/111094 A1 | 6/2018 |
| WO | WO 2018/111095 A1 | 6/2018 |

* cited by examiner

MILKING SYSTEM WITH SENSOR DEVICE

CROSS REFERENCE TO RELATED APPLICATIONS

This application is a National Stage entry under 35 U.S.C. § 371 of PCT/IB2022/061927, filed on Dec. 8, 2022, and claims priority to NL Patent Application No. 2030111, filed on Dec. 13, 2021, the entire contents of which are incorporated herein by reference.

The present text relates to a milking system for milking a milking animal with teats, and comprising at least one teatcup for fitting on a teat of the milking animal; said teatcup has a longitudinal direction and is provided with a first milk outflow orifice that is configured for milk outflow parallel to the longitudinal direction, and a measuring chamber with a peripheral wall, connected directly and rigidly to the teatcup, a milk inlet in fluid communication with the first milk outflow orifice, with a second milk outflow orifice to a milk tube, and with a vacuum outlet, the teatcup and the measuring chamber in particular forming one rigid whole, wherein the measuring chamber further comprises a sensor device that is configured for determining a property of the milk in the measuring chamber.

Milking systems of this kind are known for example from documents WO18111092A1, WO18111093A1, WO18111094A1 and WO18111095A1 of the applicant.

A drawback of these milking systems is that they do not work well in all circumstances. In particular, the reliability of measurements with the sensor device is not always guaranteed.

Thus, an aim of the present invention is the further development of milking systems of the kind described in the introduction, so that they suffer less or no longer from the aforementioned drawback.

The invention achieves this aim with a milking system as claimed in claim 1, in particular a milking system for milking a milking animal with teats, and comprising at least one teatcup for fitting on a teat of the milking animal; said teatcup has a longitudinal direction and is provided with a first milk outflow orifice that is configured for milk outflow parallel to the longitudinal direction, and a measuring chamber with a peripheral wall, connected directly and rigidly to the teatcup, a milk inlet in fluid communication with the first milk outflow orifice, with a second milk outflow orifice to a milk tube, and with a vacuum outlet, the teatcup and the measuring chamber in particular forming one rigid whole, wherein the measuring chamber further comprises a sensor device that is configured for determining a property of the milk in the measuring chamber, wherein the measuring chamber has, in a plane perpendicular to the longitudinal direction, a first internal diameter in a first direction, and a smaller second diameter in a mutually perpendicular second direction.

Without considering oneself bound to an interpretation, the applicant assumes the following. The milk that flows into the measuring chamber sometimes moves relatively wildly, and the flow rate fluctuates considerably owing to the inherently pulsating inflow. The effects of this on the measurement accuracy of the sensor device can be reduced by increasing the volume of the measuring chamber. In its turn, that can be achieved by increasing its height or by increasing the radius of the (cylindrical) measuring chamber. However, both methods are undesirable, because a greater height means that milking animals that have a low udder can be milked less well, or even can no longer be milked. A larger radius of the measuring chamber has the consequence that the teatcups, in particular in the case of udders with teats that are close together, may push each other away. However, by providing, according to the invention, a measuring chamber that is not circularly symmetric, but has a larger diameter in one direction than in the other direction perpendicular thereto, it is at least possible to increase the volume of the measuring chamber without increasing the height, and wherein the teatcups do not need to push each other away because the measuring chambers either have not become wider in the direction between these respective teatcups, or are able to turn somewhat, so that the same effect still occurs. The measuring chamber thus has an elongated cross section in said perpendicular plane.

Thus, because the volume of the measuring chamber can be increased without the aforementioned drawbacks, this can contain more milk, so that at equal rate of inflow the relatively disturbing effect of the inflowing milk can be reduced. Furthermore, the inflowing milk can also still flow in over an increased surface area of the measuring chamber, so that everything can take place more smoothly, again with less disturbance of the sensor device in consequence.

It is to be noted at this point that in many cases the rigidity of the milk tube between the teatcup/measuring chamber combination and the milk glass is such that the orientation of the measuring chamber is fixed within a margin. This means that this can be adapted to the teats that will most often be close together. These are nearly always the rear teats. The shorter this milk tube, the smaller the freedom of rotation will be. This is particularly relevant if all teatcups can be carried simultaneously by an end part of a milking robot arm, such as that of the Lely Astronaut® system. On the other hand, a milking system with longer milk tubes, for example such as the Delaval VMS™ system, offers the advantage that the freedom of rotation is greater, so that the invention will also be effective for the individual milking animal for which a front and rear teat are closest together. Otherwise, the advantage according to the invention applies both to milking robot devices and to conventional milking devices for which the teatcups are connected by hand.

Moreover, it is noted that, just as in the milking systems according to the cited prior art, the vacuum outlet is connected to a pump. Thus, (leakage) air that enters the system for the purpose of transporting the milk in the milking system can be drawn off via this vacuum outlet. This reduces air inclusion in the milk and therefore increases the reliability and accuracy of the measurements with the sensor device. Furthermore, air included in the milking system according to the invention can escape better, because the milk remains in the measuring chamber for a longer time. After all, the volume is greater, as is the path that the milk has to travel.

Advantageous embodiments of the milking system according to the invention are described in the dependent claims, as well as in the part of the introduction to the description that now follows.

In some embodiments, the peripheral wall in said perpendicular plane has a smooth, differentiable inner periphery, wherein the milk inlet is configured for conveying milk flowing through it along at least a part of the peripheral wall. "Smooth, differentiable" means that there are no corners or bends in the inner periphery, so that the magnitude of the change of direction of the inner periphery is comparable to the shape (change of position) of the inner periphery. Moreover, conveyance of the milk along at least a part of the peripheral wall relates to conveyance from the milk inlet along the inside wall, in order to slow the milk down and strip it of air bubbles, and to ensure that the inflowing milk pulse is not directed straight onto the milk bath already present. It is important that this takes place gradually, to prevent new bubble formation, and so that slowing down lasts a relatively long time, to give the air bubbles already formed a good chance to disappear. The longer the path travelled by the milk, and the more gradually, the more chance there is of the air bubbles bursting. In particular, the peripheral wall has the shape of an oval. The term "oval" is to be interpreted widely herein, as will become clear hereunder.

In some embodiments the sensor device is placed substantially at the center of gravity, advantageously at the center of gravity, of said inner periphery, and said part of the peripheral wall runs substantially parallel to said first direction. This means that the sensor device is placed at the center of gravity of the figure delimited by the inner periphery. Thus, with movements of the teatcup at the location of the sensor device, the milk in the measuring chamber will go up and down the least. As a result, the measurements may be more reliable. Note that in the case of a cylindrical measuring chamber, the center/center of gravity is the most logical for reasons of symmetry, but that for noncylindrical measuring chambers the center of gravity as the site for the measuring sensor is not immediately obvious. Moreover, inflowing milk may thus first travel a longer path along the inside wall, to the farthest point and back again, because the measuring chamber is longer in the first direction than in the second direction. Accordingly, the milk may lose more air bubbles, if any are present. Moreover, "substantially parallel to" means that said part of the peripheral wall runs (on average) more parallel to said first direction than to the second direction, i.e. the angle of (the average of) said part of the peripheral wall with the first direction is smaller than the angle with the second direction.

Note moreover that it may also be favourable for the inflow of the milk into the measuring chamber if this takes place from substantially the center of gravity. This is favourable for the balance of the teatcup as a whole under the teat. Thus, if a guide is provided for the milk with this inflow, such as toward the side wall, it is then in its turn also favourable if this guide and the sensor device do not lie in each other's (vertical) extension, because then the teatcup with the measuring chamber would be unnecessarily high. In such a case it is favourable if both the sensor device and the inflow, at least the guide at the location of the inflow, do not both lie at the center of gravity, but if either one of the sensor device and the inflow/guide lies at the center of gravity and the other is as close as possible, or the sensor device and the inflow/guide are substantially opposite each other, with the center of gravity between them.

In some embodiments said inner periphery has the shape of an ellipse. An ellipse is a special form of an oval, namely comprising the points with an equal sum of the distances from a pair of fixed points (the foci). It is to be noted that the circle is excluded on account of the requirement of different diameters in two perpendicular directions. An ellipse offers a very smooth and uniform shape, which can also be sealed very well with for example O-rings.

In other embodiments said inner periphery has the form of two semicircles that are joined together with two straight line segments. This "racetrack" shape offers some advantages. Thus, with equal dimensions in the first and the second direction, the cross-sectional area is even greater than with an elliptical inner periphery. In addition, in this case the milk inflow from the milk inlet can take place along a straight line segment, and the smallest radius of the inner periphery can be greater than the smallest radius of an ellipse of equal area. The maximum change of direction of the milk flow is then proportionally smaller, and the milk flow may thus be even more uniform.

In other alternative embodiments, said inner periphery has the shape of an egg, with a blunt part and a pointed part. In this embodiment the center of gravity is farther away from the "end" of the sharp point than from the blunt part. Thus, inflowing milk that is directed toward said pointed part, and then of course away again from the pointed end, has to travel a relatively longer path, while also encountering a relatively sharper curve relative to an elliptical shape only at said pointed part. In addition, with these measuring chambers that are rather pointed on one side, the teatcups can be placed somewhat closer together. The sensor device is also on average somewhat farther away from the inflowing milk, and measurements are consequently less disturbed.

The aforementioned elaborate example embodiments are not intended to be limiting for the interpretation of "oval". Thus, for example a shape for the inner periphery is also possible that comprises a semicircle and an opposite second semicircle, enlarged from the diameter delimiting this semicircle, or two semi-ellipses, and so on. Each of these oval shapes, with smooth, differentiable inner periphery, may have their own advantages.

In some embodiments the milking system according to the invention comprises at least two of said teatcups for connecting to the rear teats of milking animals with four teats. A milking device of this kind, which is thus suitable for example and in particular for dairy cows, may then have teatcups with measuring chambers according to the invention for either only the rear teats, or for both the rear teats and the front teats. Since the front teats are nearly always farther apart than the rear teats, the advantage according to the invention is less relevant for front teats, and the measuring chambers of the teatcups for the front teats may also have a different shape, such as round with a larger diameter or the like.

In some embodiments of the milking system according to the invention the measuring chamber further comprises a level sensor for measuring the milk level in the measuring chamber, a controllable valve with adjustable passage, which is provided in or after the second milk outflow orifice, and a control system that is connected operatively to the level sensor and the valve, and that is configured to control, in particular continuously control, the passage of the valve on the basis of the measured milk level. In particular, the control system is configured to control the passage between a smallest open state and a largest open state during at least a part of a milking operation, more particularly wherein the control system is configured to control the passage so as to aim for a constant milk level. These embodiments have the advantages that are also described in WO2018/111095A1, namely in particular that the milked milk pulses can already be slowed down and stripped of air bubbles directly, which may be beneficial for the milk quality, and so that for example the milk level in the measuring chamber can be controlled, which may also offer advantages for other measurements that may be performed with the sensor device, such as conductivity measurements. For further details relating to features and advantages of even more particular embodiments, reference is made expressly to the aforementioned WO2018/111095A1. However, it is also possible to use some other level control, such as that the control system is configured for changing the valve between open and closed, for example with a variable frequency, depending in particular on a measured milk level or milk flow.

In some embodiments the sensor device comprises a plurality of at least three mutually separate electrodes for the purpose of measuring values of a first property of the milk by means of an electrical and/or electromagnetic quantity, said electrodes in particular being arranged in a row, and a sensor control system for controlling the sensor device and for processing the measured values, wherein the sensor control system is configured for repeated targeted selection of a pair of the electrodes, the pair comprising an arbitrary first electrode and an arbitrary second electrode that differs from the first electrode, and wherein each electrode is selectable as the first or second electrode, wherein the sensor device is configured for measuring the value of the quantity between the electrodes of that selected pair, as well as for determining the value of the property of the milk on the basis of the value or values of the quantity measured with one or more selected electrode pairs. In particular, the property of the milk comprises the height of milk in the measuring chamber, wherein the sensor device is configured to measure at least one of a conduction, a conductivity and an impedance between the first electrode of the plurality of electrodes, and the second electrode, positioned higher during milking, of the plurality of electrodes, as well as to determine the height as a function of the height of the selected pair of electrodes in the measuring chamber and compare the measured value against the corresponding value as measured with another pair of electrodes, in particular wherein the comparison shows that the measured value changes in a predetermined manner relative to said corresponding value. These embodiments have the advantages that are also described in WO2018111092A1, namely in particular the possibility of using two arbitrary electrodes for a measurement, in contrast to one fixed base electrode and one arbitrary electrode such as in the prior art. The group of electrodes to be read out may be limited to those electrodes that are adjacent to the electrodes at the level of an established milk level. This makes the readout and determination of for example that height of the milk quicker, so that for example a milk flow can be measured more accurately. In addition it is possible to test only a targeted or arbitrary part of the milk in the measuring chamber. Since it is possible to perform measurements locally at varying height in the milk (without overlap) and evaluate the local measurements, such as by averaging or determining the dispersion or the like, effects of a nonuniform amount of milk can be counteracted. In addition it is possible to perform redundant measurements, such as by selecting different pairs of electrodes, which cover different and completely or partially overlapping layer thicknesses of the milk. In this way, deviations due for example to contamination of one of the electrodes can be corrected on the basis of the other measurements. In conclusion, it is also possible to achieve a higher resolution of measurement. It is now easily possible to use a vertically more finely distributed series of electrodes without a measurement taking too much time. For further particulars regarding features and advantages of these example embodiments, reference is made expressly to said WO2018/111092A1.

It is alternatively possible for the sensor device to be provided not with electrodes but with optical sensors and in particular with one or more light sources such as LEDs placed opposite the respective optical sensors. The sensor device is then able to determine the milk level in the measuring chamber by analyzing the signals from the optical sensors. If for example a series of lower-situated optical sensors delivers a smaller signal than sensors from a height h, then h is the milk level. Other quantities, such as color, can also be determined with optical sensors.

Figure 2:
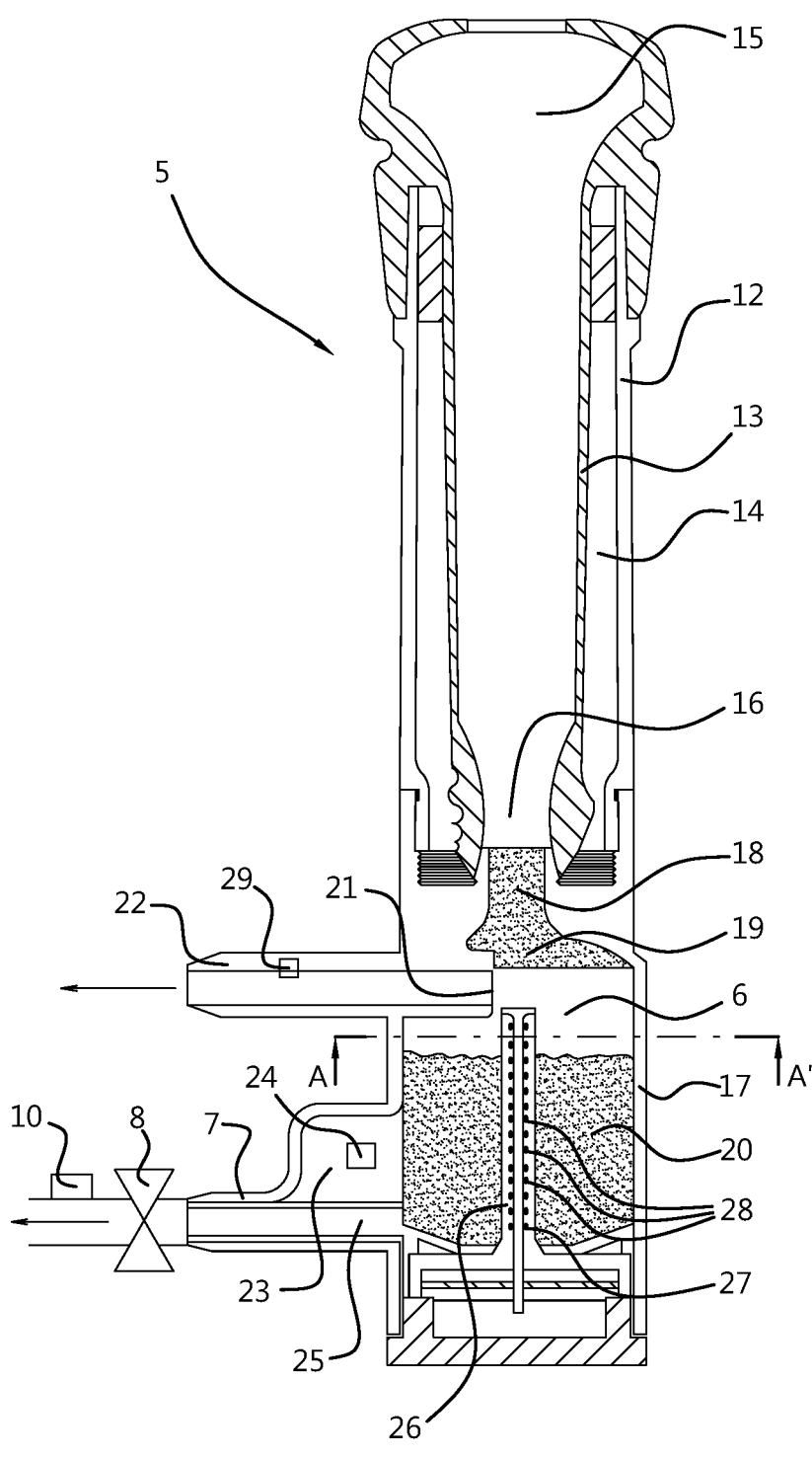
Figure 3A:
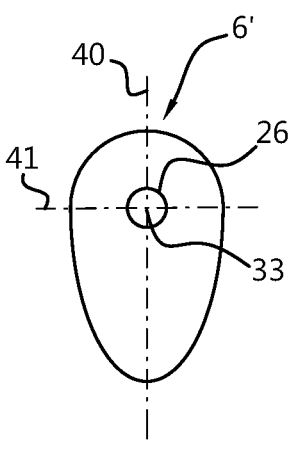
Figure 3B:
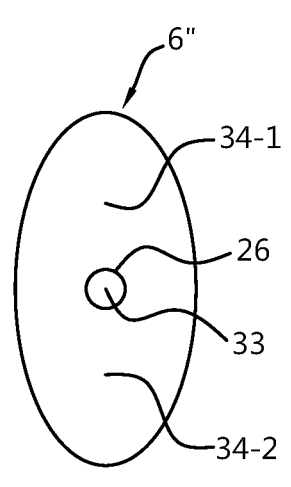
Figure 3C:
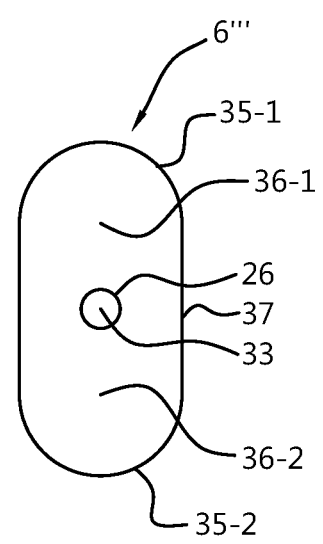
Figure 4:
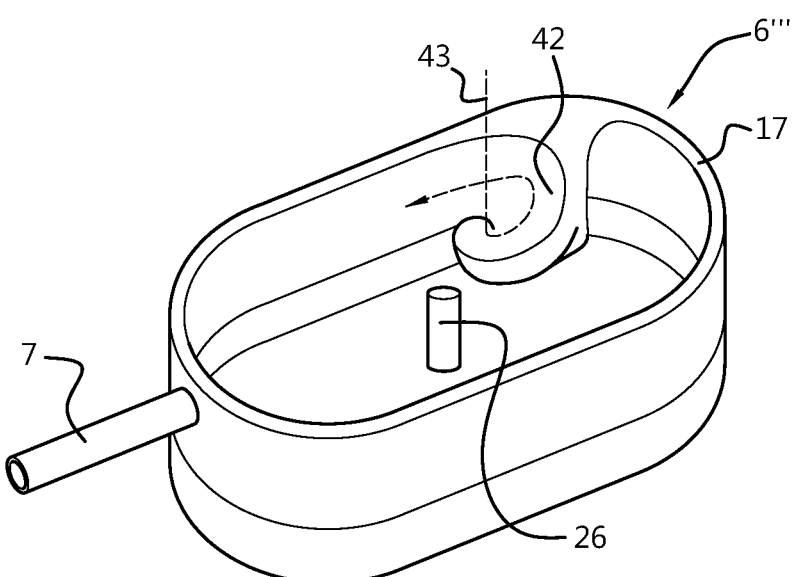

The invention will be explained in more detail hereunder on the basis of nonlimiting example embodiments, as well as the drawing, showing:

FIG. 1, a schematic side view of a milking system 1 according to the invention,

FIG. 2, a cross section of a part of a milking system 1 according to the invention, FIGS. 3A, 3B and 3C show some embodiments of measuring chambers 6' or 6" and 6''' of milking systems according to the invention, in schematic sectional view, and FIG. 4 shows a measuring chamber 6''' of a milking system according to the invention, in perspective cross section.

FIG. 1 shows schematically a side view of a milking system 1 according to the invention. The milking system 1 comprises a milking box 2 with a robot 3 with a robot arm 4 as well as a teatcup 5 with a measuring chamber 6 and a milk tube 7 with a valve 8 therein. A control system is indicated with 9 and a milk-tube milk flowmeter with 10. A camera is indicated with 11.

Moreover, a milking animal is indicated with 30, with an udder 31 and teats 32.

The milking system shown is a milking robot system, which can connect the teatcups 5 fully automatically to the teats 32 of a milking animal 30, such as a cow. However, the invention is also applicable to a conventional milking system, wherein the teatcups are connected to the teats by hand. For the robot milking system shown, components that are not of substantial importance for the invention, such as a teat detection system and milk pump, are not shown.

The teatcup 5 comprises a measuring chamber 6 with outlet into a milk tube 7. The milk tube 7 can be closed with a valve 8 that is under the control of a control system 9. The milk-tube milk flowmeter 10 is fitted after the valve 8 on the milk tube 7, for measuring the milk flow through the milk tube 7 during milking. This milk-tube milk flowmeter 10 is connected to the control system 9, as is the camera 11. This camera 11 can serve for example as an aid for determining the position of the milking animal 30 or the teats 32.

FIG. 2 shows a schematic cross section of a part of a milking system according to the present invention. Similar components are indicated herein with the same reference numbers.

The teatcup 5 comprises a teatcup shell 12 and a liner 13, with a pulsation space 14 between them. In the liner there is a teat space 15 with an outlet into a first milk outflow orifice 16. A housing 17 for the measuring chamber 6 forms a rigid whole with the teatcup 5. The first milk outflow orifice 16 has an (almost) direct transition into the milk inlet 18, which is connected via a convex outlet 19 to the measuring chamber 6. There is milk 20 in the measuring chamber 6. Above that, a vacuum line 22 is connected via a vacuum outlet 21. A measuring constriction is indicated with 23, with a supplementary sensor 24 thereon. The measuring constriction 23 runs out via the second milk outflow orifice 25 into the milk tube 7.

A level sensor is indicated with 26, which comprises a lower electrode 27 and electrodes 28. Finally, a vacuum sensor is indicated with 29.

In some embodiments, the milking system according to the invention comprises the rigid combination shown, of a teatcup 5 and a housing 17 with the measuring chamber 6. The milked milk from the teat in the teat space 15 flows via the first milk outflow orifice 16 and the milk inlet 18 directly via the outlet 19 to the measuring chamber 6. Owing to the convex shape of the outlet 19 and the Coandă effect that occurs, the incoming milk will largely "adhere" to the wall of the housing 17, thus with minimal foaming. Therefore in principle an amount of single-phase milk 20 will be formed at the bottom of the measuring chamber 6, wherein only air is present in the space above that. This air, being at a pressure below atmospheric, may be drawn off via the vacuum outlet 21 and the vacuum line 22, which are connected to a vacuum system of the milking system, which is not shown in more detail here. In principle, the pressure will correspond to a normal milking vacuum such as approx. 40 kPa.

The milked milk is received (temporarily) in the measuring chamber 6, wherein the milk level will rise at the start of milking. The level of the milk 20 in the measuring chamber 6 can be measured by means of a level sensor 26, as an example of a sensor device. In the embodiment shown, this comprises a lower electrode 27 as well as a series of electrodes 28 that extend over the height of the measuring chamber 6. In order to measure and monitor the height of the milk 20 quickly and reliably, the control system (not shown here) controls the electrodes 27, 28, by selecting two electrodes. For example, the conductivity is measured between the lower electrode 27 and in each case a higher-situated electrode of the electrodes 28, just until the conductivity measured between the selected electrode 28 and the lower electrode 27 falls below a threshold value, or falls by at least a predetermined percentage, such as 50%. It is, however, also possible to measure the conductivity between two adjacent, in each case higher-situated electrodes. An advantage of this is that if there is disturbance at or on the lower electrode 27, the former method is disturbed, whereas it has no effect on the latter method. Moreover, it is thus possible to determine a local conductivity, so that it is easier to make a judgment about the local composition (milk, milk foam or air), and possibly even about the homogeneity of the milk or the content of air bubbles.

Moreover, it is noted here that the height of the milk 20 in the measuring chamber 6 during milking has a variable value. The control system is preferably configured to monitor the height of the milk by selecting pairs of electrodes dynamically. This can be done as described above by in each case beginning at the bottom and then scanning upward. It is advantageous, because quicker, to begin a next measurement at the lowest electrode that gave a conductivity value that met the criterion "below the threshold value", "at least 50% lower conductivity" or any other predetermined criterion. If at a new measurement this electrode 28, or this electrode pair, still meets that criterion, the control system can go to a directly lower-situated electrode, and check how the conductivity value varies for this lower electrode. If the conductivity varies without satisfying an associated predetermined criterion ("remains below the threshold value", "less than 100% increase", etc.), the control system selects another electrode pair with a lower-situated highest electrode, just until the conductivity does satisfy the associated predetermined criterion. The height of the milk has then gone down. Conversely, if the new measured value of the conductivity for the earlier electrode pair no longer meets the predetermined criterion, the control system selects another, higher-situated electrode pair, until the measured value again satisfies the predetermined criterion. The height of the milk has then risen. Thus, the milking system is able to monitor changes in the height of the milk completely dynamically and accurately.

Besides, or instead of, the conductivity of the milk 20, some other quantity between the electrodes 27, 28 may also be measured, such as the impedance, in principle the complex impedance Z, or an associated quantity admittance Y (Y=1/Z). Because the admittance is so easy to convert to impedance, only impedance is discussed hereinafter. Roughly speaking, the real part thereof coincides with resistance (=1/conductivity). The imaginary part, the reactance, roughly shows the magnitude of the parts capacity and/or self-induction. These values depend on, among other things, the composition of the milk, and the frequency of the applied voltage. On the basis of the measured values as a function of the frequency, also called dielectric or impedance spectroscopy, for example contents of fat, carbohydrates, cells and/or proteins can be determined. For details about this technique, reference is to be made to the prior art, such as NL9400997 and WO2011/064770.

One advantage is that this spectroscopy can be carried out locally. For this purpose, the control system is in particular configured to select two electrodes arbitrarily and/or repeatedly, and perform the spectroscopic measurements between these two selected electrodes. With the values thus obtained (the spectrum) the control system is then able to determine a local fat content, protein content, carbohydrate content and/or cell count etc. With the local values thus obtained, the control system is then able to determine the total value of the property of the milk for the milk in the measuring chamber. It will be clear that this can provide more reliable and more precise values, for example owing to redundancy, so that deviations at individual electrodes can be corrected. In addition, corresponding values of the property or properties of the milk can be determined for a part of the milk, such as a top layer (foam layer) or the like.

The milking system optionally comprises for the aforementioned purpose a frequency generator, which is not shown separately here. The frequency generator may be connected actively to the electrodes 27, 28 by the control system, and is configured to apply an AC voltage between the selected electrodes. The resulting impedance between the selected electrodes is then measured by the control system or a dedicated device (not shown here) connected actively to the control system.

The level sensor 26 is connected effectively to the control system 9, and supplies a signal related to the measured height of the milk. The control system 9 is also connected to the optional control valve 8. The size of the passage of the valve 8 can be determined by the control system on the basis of the measured milk level. If the milk level in the measuring chamber 6 rises, at least to above a desired value, then evidently the milk inflow has increased. To compensate this with an (approximately) equal milk outflow through the second milk outflow orifice 25, the control system can open the valve 8 further. Conversely, if the milk level falls, the control system will close the valve further. Thus, a milk level in the measuring chamber 6 is achieved that is substantially as uniform as possible.

One advantage of this is for example that the measuring constriction 23 connected to the measuring chamber 6 and the second milk outflow orifice 25 can always be kept completely under milk but also will have fresh milk flowing through all the time. Very reliable measurement of milk properties can thus be guaranteed. For this purpose, for example a supplementary sensor 24 is provided on the measuring constriction 23. This supplementary sensor comprises for example an optical sensor, with a light source on one side of the measuring constriction and a photodiode or the like on the opposite side of the measuring constriction. The sensor 24 then measures for example the permeability to one or more colors, based on which a judgment can be made about the composition of the milk, such as fat content or for example blood-stained milk. The sensor may be connected to the control system 9, so that the control system 9 can, on the basis of the measured value from the supplementary sensor 24, adjust one or more settings of the milking system 1. Moreover, the sensor 24 may also be provided in or instead of the level sensor 26.

Moreover, supplementary sensors other than the optical sensor described are also possible, such as conductivity sensors and the like. The level sensor 26 may also be of a different kind than the kind described with the stacked electrodes, and may for example be a sensor that operates on the basis of optical permeability of the measuring chamber 6. In the case of a level sensor 26, but also in many other cases, it is advantageous according to the invention if the sensor device is placed at the center, or the center of gravity, of the inner periphery of the measuring chamber 6. With motion of the teatcup 5 with measuring chamber 6, the influence of fluctuations of the milk level will then be smallest on average.

The measuring constriction 23 is herein for example a narrowed part of the measuring chamber, with two (approximately) parallel walls, which may be permeable to light or other radiation or fields.

The level sensor 26 may sometimes measure an incorrect height of the milk 20 in the measuring chamber 6, such as if the level sensor 26 is not located at the center or the center of gravity, but for example along a wall of the measuring chamber 6, and this makes an angle with the vertical, such as on connecting the teatcup 5 on a slanting teat. To correct this, use may be made of a tilt sensor, such as the camera 11 in FIG. 1. This can determine whether the teatcup with the housing 17 of the measuring chamber 6 is at an angle to the vertical, and if so, can determine this angle by means of suitable image processing software. The angle thus obtained can be sent to the control system 9, which can then determine the correct height of the milk in the measuring chamber 6 according to simple geometric formulas.

FIGS. 3A, 3B and 3C show some embodiments of measuring chambers 6' or 6" and 6''' of milking systems according to the invention, in schematic sectional view in the plane A-A' in FIG. 2. Note that the measuring chambers in each case have a housing such as housing 17 in FIG. 2. However, this is not indicated separately in each case.

FIG. 3A shows a measuring chamber 6' with an egg-shaped cross section, with a center of gravity 33, where the sensor device 26 is placed. A first direction is indicated with 40, and a second direction with 41. These directions also apply to the other two figures. The egg shape can be interpreted relatively widely, and may for example comprise a semicircle and a stretched semicircle, a semicircle and a semi-ellipse, two semi-ellipses with different major axis, and so on. It will be clear that the volume of the measuring chamber is thus greater than if the measuring chamber had a circular shape with a diameter such as the measuring chamber 6' shown has in the second direction 41. In this second direction, teatcups/measuring chambers 6' situated next to each other will not push each other away more quickly, whereas the behavior of the milk in the measuring chamber 6' becomes calmer owing to the increased volume.

This embodiment also offers an advantage when milk does not flow into the measuring chamber 6' directly from above, but via a guide substantially along the inside wall of the measuring chamber 6' and thus very possibly parallel to the first direction and flows in toward the "point" at the bottom in FIG. 3A. The milk can then flow for longer, and possibly with reduced foaming. Moreover, placing the sensor device at the center of gravity has the aforementioned advantage that the milk level will vary least when there are movements. This also applies in principle to the other embodiments shown here, and even in general to the invention, and will be explained in more detail in connection with FIG. 4.

FIG. 3B shows a measuring chamber 6" with an elliptical cross section, with two foci 34-1 and 34-2. Once again, a sensor device 26 is placed at the center 33. From considerations of symmetry as well as the smooth inner periphery of the measuring chamber 6", this embodiment has for example the advantage of simple and very reliable sealing with O-rings.

FIG. 3C shows a measuring chamber 6" with a racetrack-shaped cross section, comprising two semicircular parts 35-1 and 35-2, with centers 36-1 and 36-2 respectively, as well as a straight part 37. Once again, a sensor device 26 is placed at the center of gravity 33. An advantage of this embodiment is that the cross-sectional area, and thus the volume, of the measuring chamber 6''' at equal dimensions in the first and second directions 40, 41, is greater than for the egg-shaped measuring chamber 6' in FIG. 3A, as well as than that of the elliptical measuring chamber 6" in FIG. 3B. Furthermore, it may be advantageous for the inflow of milk along the inside wall, that this inside wall has a smaller minimum curvature. This milk inflow may become even calmer as a result.

FIG. 4 shows a measuring chamber 6''' of a milking system according to the invention, in perspective cross section, for the part under the plane A-A' in FIG. 2.

The housing 17 of the measuring chamber 6''' has the same cross section here as that according to FIG. 3C, as well as a "curl" 42 over which the milk flows in from the teatcup (not shown). The milk roughly follows the path shown with the dashed line 43.

The curl 42 ensures that the inflowing milk, which is supplied centrally from the teatcup, is conveyed relatively smoothly to the housing 17, where the milk can continue to flow downward along the inside wall thereof. This relatively long, smooth path is favourable for removing any air/milk bubbles formed as much as possible, without too much damage to fat globules in the milk through mechanical action.

It is to be noted that the curl 42 is not to scale relative to the housing 17, and that it is in practice preferably relatively larger, in order to guarantee a smoother course. Furthermore, it is favourable not to place the curl 42 and the sensor device 26 both at the center of gravity 33 (not shown separately here), because they would then have to be placed above one another, which may have an unfavourable effect on the height of the whole. Preferably the curl 42 and the sensor device 26 are placed staggered relative to each other, wherein either one of the two is still placed at the center of gravity, thus in general in and along the vertical line through the center of gravity, or both admittedly away from the center of gravity, but then in vertical projection substantially opposite each other, and with the center of gravity between them.

The embodiments shown are not intended to be limiting, but only for explanation of the invention, for better understanding thereof. The extent of protection of the invention is determined by the appended claims.

The invention claimed is:

1. A milking system for milking a milking animal with teats, comprising:
   at least one teatcup for fitting on a teat of the milking animal, said teatcup having a longitudinal direction and being provided with a first milk outflow orifice that is configured for milk outflow parallel to the longitudinal direction, and a measuring chamber with a peripheral wall, connected directly and rigidly to the teatcup, a milk inlet in fluid communication with the first milk outflow orifice, with a second milk outflow orifice to a milk tube, and with a vacuum outlet, the teatcup and the measuring chamber forming one rigid whole, wherein the measuring chamber further comprises a sensor device that is configured for determining a property of the milk in the measuring chamber, wherein the measuring chamber has, in a plane perpendicular to the longitudinal direction, a first inside diameter in a first direction, and a smaller second diameter in a mutually perpendicular second direction.

2. The milking system as claimed in claim 1, wherein the peripheral wall in said perpendicular plane has a smooth differentiable inner periphery, wherein the milk inlet is configured to convey milk flowing through it along at least a part of the peripheral wall.

3. The milking system as claimed in claim 2, wherein the sensor device is placed at a center of gravity of said inner periphery, and wherein said part of the peripheral wall runs substantially parallel to said first direction.

4. The milking system as claimed in claim 2, wherein said inner periphery has a shape of an ellipse.

5. The milking system as claimed in claim 2, wherein said inner periphery has a shape of two semicircles that are joined with two straight line segments.

6. The milking system as claimed in claim 2, wherein said inner periphery has a shape of an egg, with a blunt part and a pointed part.

7. The milking system as claimed in claim 2, wherein the peripheral wall in said perpendicular plane is in the form of an oval.

8. The milking system as claimed in claim 1, comprising at least two of said teatcups for connecting to the rear teats of milking animals with four teats.

9. The milking system as claimed in claim 1, wherein the sensor device is a level sensor for measuring the milk level in the measuring chamber, and wherein the milking system further comprises a controllable valve with adjustable passage, which is provided in or after the second milk outflow orifice, and a control system that is connected operatively to the level sensor and the valve, and is configured to control the passage of the valve on the basis of the measured milk level.

10. The milking system as claimed in claim 9, wherein the control system is configured to control the passage between a smallest open state and a largest open state during at least a part of a milking operation.

11. The milking system as claimed in claim 10, wherein the control system is configured to control the passage so as to aim for a constant milk level.

12. The milking system as claimed in claim 10, wherein the control system is configured to control the passage so as to aim for a constant milk level.

13. The milking system as claimed in claim 9, wherein the control system is configured to continuously control the passage of the valve on the basis of the measured milk level.

14. The milking system as claimed in claim 1, wherein the sensor device comprises a plurality of at least three mutually separate electrodes for the purpose of measuring values of a first property of the milk by means of an electrical and/or electromagnetic quantity, wherein the milking system further comprises a sensor control system for controlling the sensor device and for processing the measured values, wherein the sensor control system is configured for repeated targeted selection of a pair of the electrodes, the pair comprising an arbitrary first electrode and an arbitrary second electrode that differs from the first electrode, and wherein each electrode is selectable as the first or second electrode, and wherein the sensor device is configured to measure a value of a quantity between the electrodes of that selected pair, as well as for determining the value of the first property of the milk on the basis of the value or values of the quantity measured with one or more selected electrode pairs.

15. The milking system as claimed in claim 14, wherein the property of the milk comprises a height of milk in the measuring chamber, wherein the sensor device is configured to measure at least one of a conduction, a conductivity and an impedance between the first electrode of the plurality of electrodes, and the second electrode, positioned higher during milking, of the plurality of electrodes, as well as to determine the height as a function of a height of the selected pair of electrodes in the measuring chamber and a comparison of the measured value with the corresponding value as measured at another pair of electrodes.

16. The milking system as claimed in claim 14, wherein the at least three mutually separate electrodes are arranged in a row.

17. The milking system as claimed in claim 14, wherein the comparison shows that the measured value changes in a predetermined manner relative to said corresponding value.

* * * * *